March 20, 1956 B. A. SCHWARZ 2,739,232

FAVORITE STATION SIGNAL SEEKING RADIO TUNER

Filed July 3, 1952 5 Sheets-Sheet 1

INVENTOR.

Bertram A. Schwarz

BY

Willits, Helwig & Baillio

ATTORNEYS

March 20, 1956 B. A. SCHWARZ 2,739,232

FAVORITE STATION SIGNAL SEEKING RADIO TUNER

Filed July 3, 1952 5 Sheets-Sheet 2

INVENTOR.
Bertram A. Schwarz
BY
Willits, Helwig & Baillio
ATTORNEYS

FAVORITE STATION SIGNAL SEEKING RADIO TUNER

Filed July 3, 1952 5 Sheets-Sheet 3

INVENTOR.
Bertram A. Schwarz
BY
Willits, Helwig & Baillio
ATTORNEYS

FAVORITE STATION SIGNAL SEEKING RADIO TUNER

Filed July 3, 1952 5 Sheets-Sheet 4

INVENTOR.
Bertram A. Schwarz
BY
Willits, Helwig & Baillio
ATTORNEYS

INVENTOR.
Bertram A. Schwarz
BY
Willits, Helwig & Baillio
ATTORNEYS 2,739,232

FAVORITE STATION SIGNAL SEEKING RADIO TUNER

Bertram A. Schwarz, Kokomo, Ind., assignor to General Motors Corporation, Detroit, Mich., a corporation of Delaware Application July 3, 1952, Serial No. 297,069

13 Claims. (Cl. 250—20)

This invention relates to means for automatically indexing movable means to stop at certain designated points. More specifically, it relates to automatic tuning means for radio receivers in which it is desired to set the tuning means to receive predetermined stations.

Radio receivers were first tuned manually by adjusting a knob to index the tuning means to receive a certain broadcast frequency. This required the operator's full attention in making a careful adjustment in tuning from one station to another and in the case of radio receivers mounted on automobiles, often took the attention of the driver from the road and was dangerous. Various forms of so-called push button tuning were devised which included that which provided a single switch for actuating the same, the closure of which operated in various manners a plurality of preset devices in sequence to tune in the desired stations. However, in the operation of radio receiving means on automotive vehicles, the problem of resetting the mechanical cams, forming a part of these automatic tuners, arises when the vehicle is driven from one geographical locality to another out of range of the originally adjusted stations.

A further type of automatic tuner has been placed on the market for radio receiving sets which is termed a "signal seeking tuner" or "signal actuated" tuning means. In this type the appearance of the incoming signal itself actuates a triggering means when a station is brought into tune to stop the scanning or driving means for tuning the receiver over the band. This type of tuner is disclosed in a co-pending application Serial No. 193,148, in the names of Bertram A. Schwarz and Manfred G. Wright, filed October 31, 1950, now Patent No. 2,701,336 granted February 1, 1955. This type of tuner requires no preadjustment and, as it scans the band for which the receiver is designed, will stop if the tuner encounters any signal on the air above a predetermined strength. Thus as the location in which the receiver is operated changes, or the stations which are on the air vary, the tuner will automatically index only those signals received, requiring no presetting or adjustment.

In this type of tuner, however, the operator cannot tune directly to a given desired station. It is necessary to know the approximate frequency of the station desired and then hold down the trigger switch to cause the tuner to scan the band until it reaches the general location on the band before releasing the switch to let the automatic tuning means take over to index on the desired station. Since the number of stations to which the operator may desire to tune regularly is relatively small, it would be a considerable advantage to provide not only tuning means capable of tuning in a plurality of definite preset stations frequently listened to, but also to have the additional advantage of the so-called "signal seeking" tuner at the same time.

It is therefore one of the objects in this invention to provide automatic control means for radio tuners which will tune in a series of stations whose transmitting index frequencies have been preset and which is also capable of being indexed by the appearance of signals from transmitting stations at the receiver, alternatively.

It is a further object in this invention to provide automatic tuning means for radio apparatus that will scan the band, selecting stations on the air in order, and index to each in sequence, and which will also index certain preselected stations in sequence when desired.

With these and other objects in view which will become apparent as the specification proceeds, my invention will be best understood by reference to the following specification and claims and the illustrations in the accompanying drawings, in which:

The so-called signal seeking tuner or stop-on-station tuner which is fully described in co-pending application Serial No. 193,148, referred to above, consists in general of a motive means which causes the tuner to be moved over a particular distance to scan the frequency band desired. If a signal is received during this movement, a detent is moved into the path of a portion of the moving means to stop the same at once. This detent is moved to release the motor drive by operation of a relay and the relay is controlled in turn by a triggering tube whose conductive periods are determined by the presence of incoming signals in the receiver proper.

If some overriding means is added for preventing the tube from acting to deenergize the relay for indexing, then the driving means will continually cause the tuner to cyclically scan the frequency spectrum. The two different forms of my invention in the present instance utilize two alternate ways to prevent the control or trigger tube from operating to deenergize the relay and permit indexing except during very narrow predetermined bands of the spectrum. When the device is adjusted for ordinary signal seeking tuning, the presence of the identifying control indices does not in any manner interfere with the signal seeking operation, but when the device is placed in condition to provide predetermined set station sequence tuning, the signal seeking drive still actuates to scan the band, but the index stopping means is only operable at definite narrow channels in which the predetermined desired stations lie.

Figure 7:
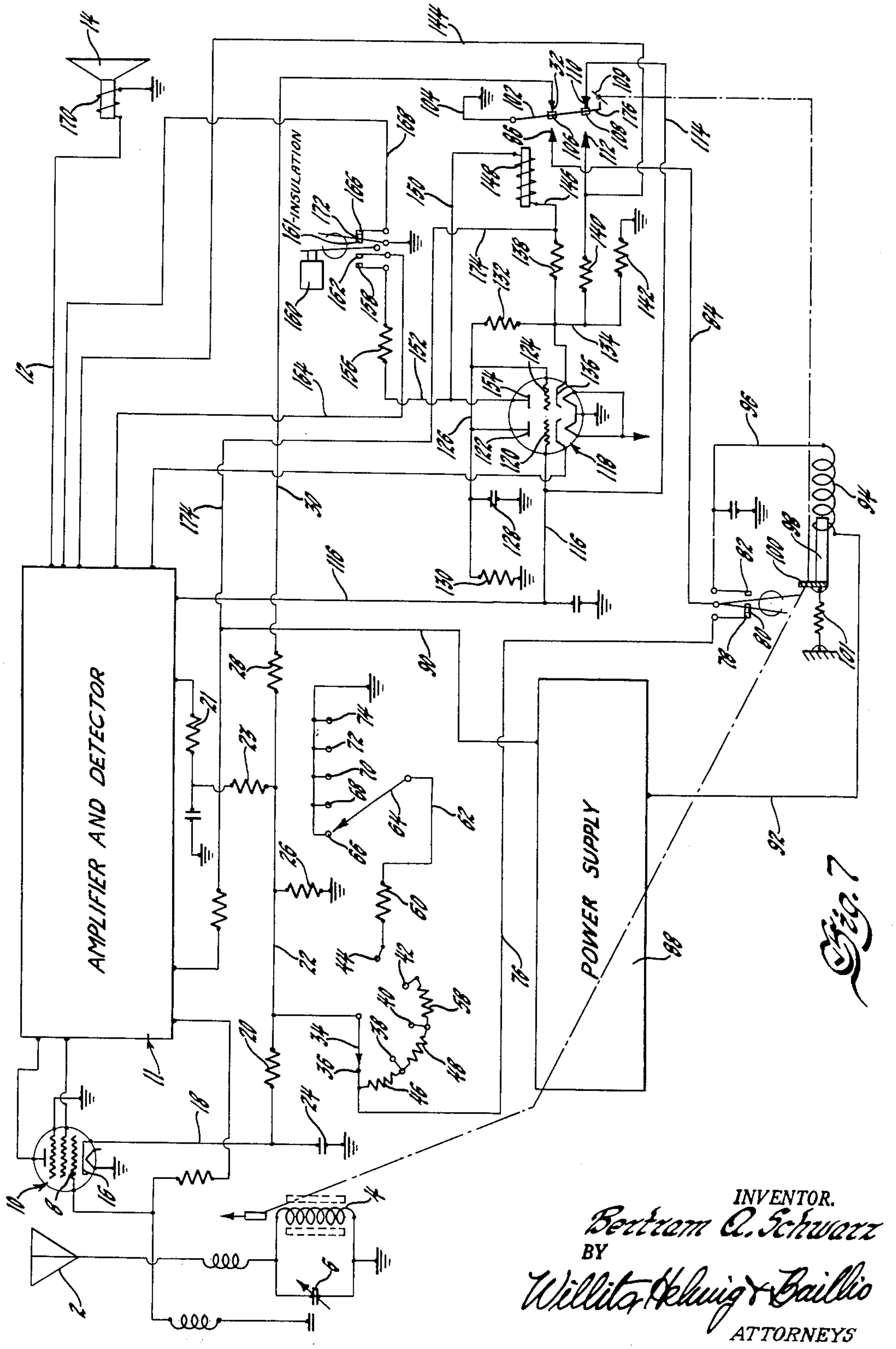
Figure 7 is a schematic wiring diagram of a radio receiver and tuning means of that embodiment shown in Figures 1 through 4.

With this general statement, reference will now be made more specifically to that form of the invention disclosed physically in Figures 1 through 4 and electrically on the wiring diagram of Figure 7. In the latter figure there is shown a receiving antenna 2 which is connected, through a tunable inductance 4 and adjustable capacity 6 which form a tuned antenna circuit, to the control grid 8 of the first radio frequency amplifier tube 10 of the receiver. The output of the radio frequency amplifier is shown connected in a conventional radio receiving set consisting of radio frequency amplifiers, a detector and audio frequency amplifier identified as "amplifier and detector" 11, the output of which is connected through line 12 to a loud speaker 14. The cathode 16 of the radio frequency amplifier tube 10 is connected through line 18 to one terminal of a resistor 20, the opposite terminal of which is connected to line 22. Line 18 is likewise connected to ground through condenser 24. A resistor 26 of very high ohmic value is connected between line 22 and ground. Resistors 23 and 21 are connected in series between line 22 and the cathodes of the R. F. and/or I. F. amplifier tubes (not shown). Line 22 is also connected to one terminal of a resistance 28, the opposite terminal of which is connected to line 30 which extends to a stationary contact 32 on the control relay.

Line 22 is also connected to a movable arm 34, identified as the sensitivity control for the tuner, which is adapted to contact a plurality of stationary contacts 36, 38, 40, 42 and 44. Resistors 46, 48 and 58 are connected between stationary contacts 36, 38, 40 and 42 respectively. Contact 44 on the other hand is connected to a resistor 60, the opposite terminal of which is connected through line 62 to the contact member 64 on the movable indicating point of the tuner which is adapted to engage the various adjustable grounding contacts 66, 68, 70, 72 and 74 as will be described. Stationary contact 36 of the sensitivity control is likewise connected through line 76 to a stationary contact 78 of a snapover reversing switch which controls a circuit to cause the tuning means to be moved back to its initial position after the spring motor has scanned over the spectrum. A movable snapover contact 80 which is adapted to contact either stationary contact 78 or stationary contact 82 of the reversing switch is connected through line 84 with a stationary contact 86 on the control relay.

A conventional source of power 88 is provided which is identified as "power supply." This is connected through line 90 to the amplifier and detector 11 to provide the necessary power therefor and also through line 92 to one terminal of a cocking solenoid 94, the opposite terminal of which is connected through line 96 to the stationary switch terminal 82 previously identified. The cocking solenoid moves, through attracting its core 98, the bar 100 upon which the tuning means is carried to load the driving spring. Travel in the opposite direction for scanning tuning is diagrammatically shown as being provided by spring 101. In reality it is a spring-loaded means providing a relatively slow scanning movement.

The relay armature 102 is connected to ground through line 104 and carries movable contact 106 adapted to alternately engage stationary contacts 32 and 86 and also movable contact 108 which alternately engages spaced stationary contacts 110 and 112. Stationary contact 110 is connected through line 114 to line 116, which is the line upon which control signals are fed from the amplifier and detector to the control tube 118. Line 116 is directly connected to the control grid 120 of the first section of the control tube 118. Plate 122 of this first triode section is directly connected to control grid 124 of the second triode section through line 126. This line is also connected to ground through condenser 128 and through a parallel circuit to ground through resistor 130.

Line 126 is likewise connected to one teminal of resistor 132, the opposite terminal of which is connected to line 134, the latter being connected directly to cathode 136 of the second triode section as well as to one terminal of a plurality of resistors 138, 140 and 142. The opposite terminal of resistor 142 is grounded. The opposite terminal of resistor 140 is connected directly to stationary contact 112 of the relay and likewise to a line 144 which extends back to the audio frequency amplifier. The opposite terminal of the resistor 138 is connected through line 146 to one terminal of the relay operating coil 148, the opposite terminal of which is connected through line 150 to a tie line 152 connected between the plate 154 of the second triode section of the tube 118 and one terminal of a resistor 156. The opposite terminal of the resistor 156 is connected to a stationary contact 158 on the manually operated spring biased initiating switch 160. A movable switch contact 162 of this switch which is forced against the stationary contact 158 when the switch is operated is connected through line 164 back to a ground through resistors in the amplifier. Insulating material 161 on the back of contact 172 prevents grounding of contact 162 when the switch is operated. A spaced stationary contact 166 of the initiating switch 160 is connected through line 168 with the output transformer coil of the amplifier (not shown). Movable contact 172, which cooperates with the stationary contact 166, grounds line 168 when switch 160 is in the inactive position. Line 174 extends between the power supply line 90 and line 146. The end of the relay armature 102 is bent over to form a detent 176 so that when the relay is deenergized this detent will drop into the spring driven governor 109 to stop the same.

In the operation of the tuner, the set is energized to receive signals and then switch 160 is depressed. When this occurs, switch contacts 158 and 162 close to complete an energizing circuit for the relay 148. The relay 148 attracts its armature 102, lifting the mechanical detent from the governor so that the drive may operate, opening contacts 106—32 and 108—110 and closing contacts 86—106 and 112—108. In the absence of a positive signal on line 116 the closing of contacts 112 and 108 establishes bias conditions for the second section of tube 118 such that the plate current through 154 and relay 148 will be adequate to hold the relay energized after actuating switch 160 is released. It will be noted that during the deenergized period control grid 120 of the first triode section was grounded so that this section of the tube was non-conductive, and the receiver is so designed that there is no positive control voltage present on line 116 until an incoming station is encountered, as explained in the arlier filed application Serial No. 193,148.

The spring motor diagrammatically illustrated at 101 will, therefore, tend to pull the tuning means diagramatically indicated as 100 over the band until such time as the set tunes to an incoming signal received on the antenna 2. The receipt of such a transmitted signal will develop a positive control pulse on line 116 from the receiver, driving grid 120 positive and permitting the first triode section of the tube to conduct. The control voltage on the second control grid 124 will then be reduced and this section of the tube will be driven nonconductive, causing the relay 148 to drop its armature 102, thus immediately stopping the tuning means, grounding the control grid 120 of the first triode section and completing the circuit between line 30 and ground to restore listening sensitivity to the receiver. The sensitivity of the receiver is, of course, determined by the potential applied to the cathodes of the various amplifier tubes such as 10 or any of the R. F. and/or I. F. amplifier tubes (not shown), and if the cathodes of the amplifier tubes are connected to ground through resistor 20 or resistors 21 and 23 in series with common resistor 28, a certain predetermined sensitivity is provided for the set when operating on a given station.

However, it may be desirable to provide an adjustable control for different sensitivities during the tuning cycle so that a control signal of sufficient amplitude to trigger the stopping means will be provided by different strengths of incoming signals. In this way the receiver may be so adjusted as to stop only on strong local stations or, if the sensitivity is increased greatly, to stop oin almost any station which can be heard on the air. This adjustment is provided through the sensitivity control 34 which may be adjusted over taps 36, 38, 40 or 42, an obvious circuit being completed to ground through the various resistances 46, 48 or 58 by contact between stationary contact 86 and relay armature 102 when the set is tuning.

When the spring motor 101 has moved the tuning means to one extreme of travel, it engages a snapover switch 80, breaking contacts 78 and 80 and making contacts 80 and 82 to complete a circuit from the power source through the solenoid 94, energizing the same. This will cause the solenoid 94 to pull or move the tuning means immediately to the other extreme of travel in a very short period of time, loading the spring motor means and at the same time throwing the snapover switch 80 back to its original position and breaking the solenoid circuit again. Thus the cyclic scanning action consists of a series of relatively slow scanning movements over the scale in one direction provided by the spring-driven motor action and a quick return to the opposite limit loading the spring caused by the solenoid action. This operation is the usual operation of a so-called signal seeking tuner as described in my co-pending application.

It will be noted, however, that the sensitivity control 34 is provided with an additional contact 44 connected to a resistance 60 in series with a contact 64 on the indicating needle of the receiver. This receiver needle contact is adapted to engage various adjustably positionable grounded contacts which are placed in approximate alignment with the station which it is desired to tune. If the sensitivity switch arm 34 is moved to engage stationary contact 44 it will be obvious that in the scanning position with the armature 102 of the relay 148 to the left, the only possible circuit from cathode line 22 to ground (except through the very high resistor 26) will be through the resistor 60 and the indicating needle 64. Therefore, as long as the indicator needle contact does not engage one of the adjustable grounded contacts 66 through 74 inclusive, the cathodes will float, making it impossible for sufficient amplification to be provided to produce a control pulse of useable magnitude on control line 116 and the signal seeking stopping feature will be incapacitated. When needle 64 encounters one of the adjustable contacts 66 through 74, the grounding circuit will be completed, restoring the normal sensitivity of the receiver, and if a station lies in the vicinity of that point, the reception of a signal therefrom will create a control pulse to de-energize the relay 148 and index the tuner. These indexing tabs are narrow and cover little more than the width necessary to cause stoppage on the station transmitting on a frequency indicated on the dial therebehind.

To pass onto the next station as long as sensitivity control 34 engages stationary contact 44, the operator has only to depress the control switch 160 which energizes the relay 148, attracting its armature to start the spring drive, and the indicating needle will, of course, immediately move off the control index tab, and since the sensitivity circuit cannot be completed until it reaches the next adjusted tab, the tuner will continue to drive. When it does reach the next tab, the sensitivity of the receiver will be restored and the stopping operation will be as indicated in the first instance. Thus with the sensitivity switch 34 on the position 44, the tuner will operate as a sequence tuner to receive the associated stations indicated by the locations of the various adjustable tabs in order. If it is desired to return again to the signal seeking operation alone, then sensitivity control arm 34 is moved to engage one of the stationary contacts 42, 40, 38 or 36, depending upon whether the operator desires a number of stations or only the strong local ones.

The physical apparatus forming the tuning means of my invention is illustrated in Figures 1 to 4 inclusive and consists in general of a main frame 204 in which is carried the tuning means 206 which in this instance is shown as variable inductance means consisting of a plurality of coils 208 having associated cores 210 that are commonly mounted on a reciprocating cross bar 100, the movement of which tunes the receiver. Any other type of tuning means may be utilized. As previously mentioned, the bar is moved in the tuning direction by a resilient means 101 and returned in the opposite direction by a solenoid 94 through the operation of a limit switch 80. A link 214 is pivotally and slidably mounted on the frame and is connected to the reciprocating cross bar 100. An indicator needle 216 of non-conductive material such as plastic is secured to the forward end of the link and has transverse straight line motion across the front of the tuner. A dial plate 218 is carried by a bracket 220 secured to the front panel of the frame and lies directly behind the path of the end of the needle which extends over the top of the dial and then down in front of the same.

A second supporting bracket 222 is punched out of the front panel of the frame to support the selector switch assembly 160 below the dial. A cover plate 198 is mounted on the front panel by any suitable means and extends over the indicating needle, dial assembly and switching means to protect the same. This cover plate is provided with a rectangular opening 196 in the lower portion through which the operating bar of the switch 160 projects. It also has a second rectangular opening 199 above the first and both openings are surrounded by a raised bezel 201. A glass plate 200 is mounted in the second opening through which the dial may be viewed. Above the glass plate 200 a section 202 of the bezel is removably mounted, being held in place by friction providing access to the interior for adjusting purposes to be described.

A roughly triangular flat plate 224 has an extended section 226 offset in a parallel plane thereto, the latter section being secured to the top of the frame by machine screws 228. This triangular plate fans outwardly, the forward edge extending substantially across the top of the dial. Ears 230 are bent downwardly from the two forward corners to support a rod 232 made of electrical insulating material above the dial 218. A substantially rectangular plate 234 having an angular offset supporting arm 236 rigidly secured to section 226 of the triangular plate 224, extends beneath the rear portion of the latter. A longitudinal guide slot 238 is provided in this plate 234. A plurality of adjustable contact members 66, 68, 70, 72 and 74 all of the same configuration are adapted to be mounted between the two plates and extend forward and are supported near their forward ends by the insulating rod 232.

Figures 4, 5:
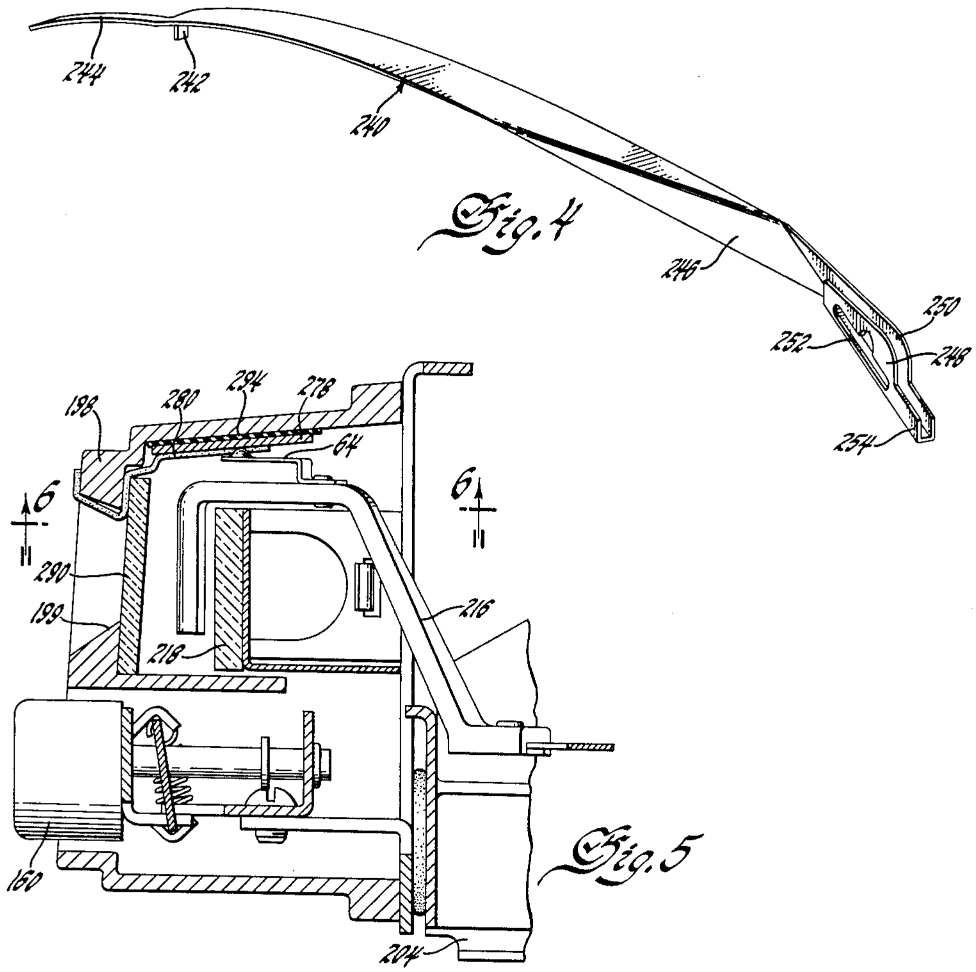
Figure 4 is a perspective view of one of the adjustable contact members which are preset for control.
Figure 5 is a longitudinal vertical sectional view through the indicating and control dial portion of a tuner taken on line 5—5 of Figure 6 showing a modified form of my invention.

The structure of these adjustable arms is best shown in Figure 4. Each is made from a flat strip 240, the central section of which is bowed upwardly. Near the rear or inner end a locating and guide tang 242 is bent downwardly to ride in slot 238 of plate 234. The inner end 244 beyond the tang 242 is likewise bowed upwardly and is at an angle to the central section.

A flat section 246 extending at an angle to the plane of the strip and across the same toward the front, is forced slightly downward so that when assembled the next adjacent member will ride up over the same in nesting relation when the two are placed in juxtaposition. Both sides of the foremost portion of the strip are bent at right angles to the main plane of the member to form two parallel ears 248 and 250 and have aligned irregular openings 252 therein.

Figure 1:
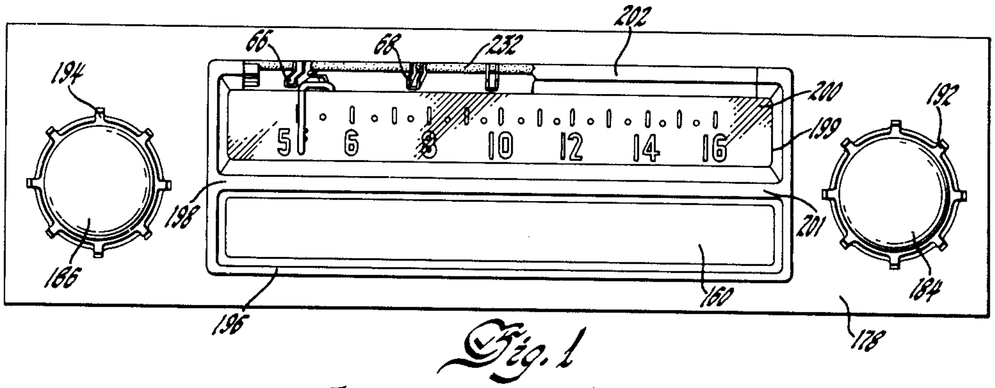
Figure 1 is a front elevational view of a radio receiver embodying my invention.
Figure 2:
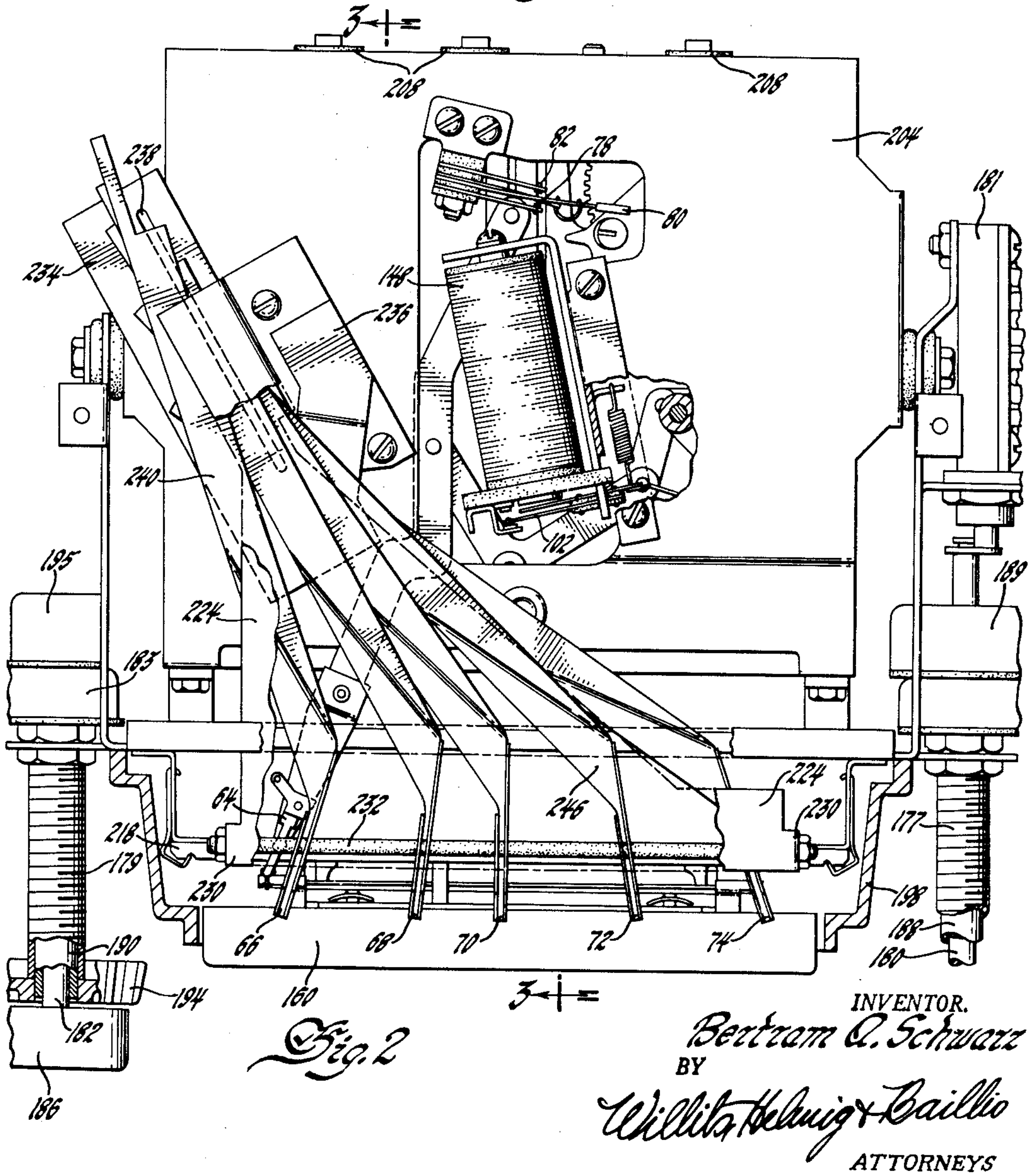
Figure 2 is a top plan view of a radio tuning means embodying my invention, parts being broken away and shown in section.
Figure 3:
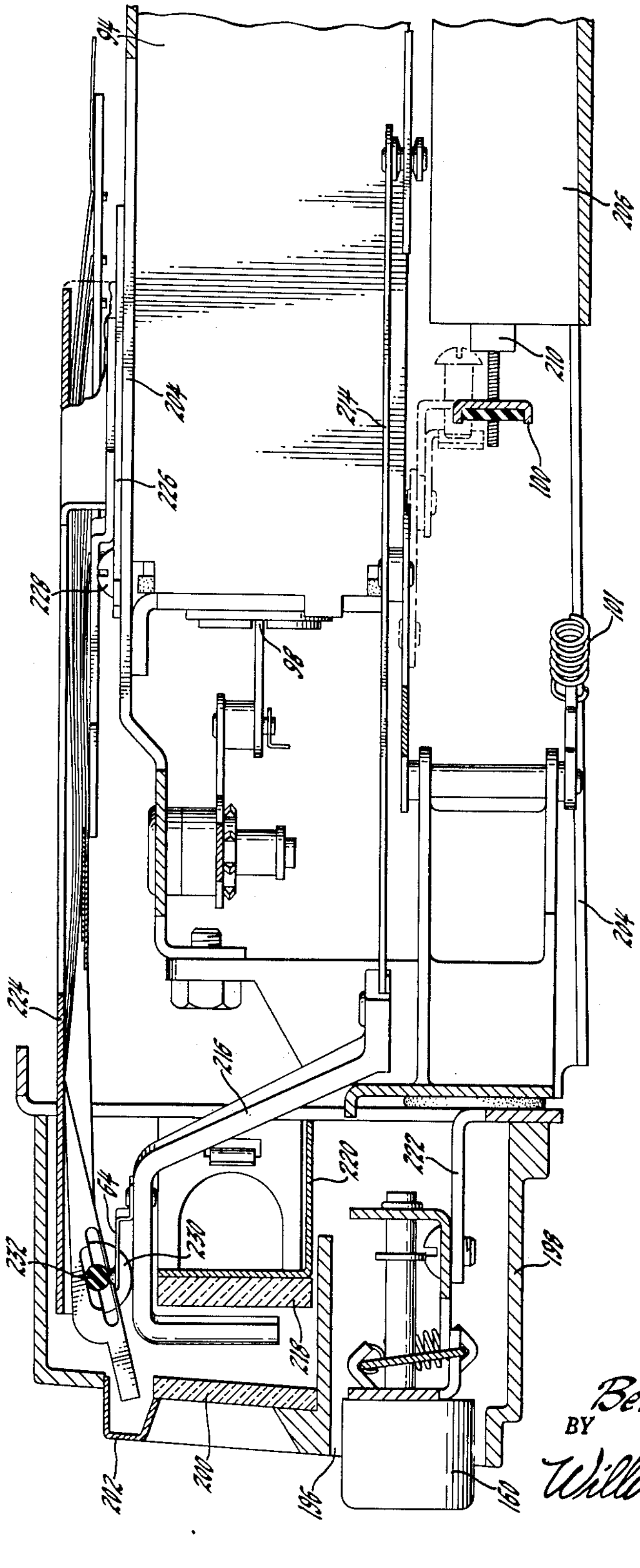
Figure 3 is an enlarged sectional view taken on line 3—3 of Figure 2.

In assembled relation these members 240, which form the adjustably positioned indexing means 66—74, are stacked one above the other between plates 224 and 234, each with its locating tang in slot 238, slightly behind the tang for the next adjacent member to the right as viewed in Figure 2, and with the insulating rod 232 extending through the irregular opening 252 in each to act as a guide track. The forward end 254 of each is accessible to the operator when the removable section 202 of the bezel is removed and by grasping the end 254 of one of the adjustable means it can be moved along the dial to any desired position. The order of the adjustable stops from left to right must remain the same but any one stop may be moved to any position between the adjacent stops on each side and held in place by friction. Due to the configuration they may be located very close together.

Mounted on top of the indicating needle 216, which is of insulating material, there is an electrical contact 64 spring biased to ride against the insulating rod 232 and the under surface of any of the adjustable stops that it may encounter. When it is in engagement with the rod no electrical circuit is completed thereto but when it engages any one of the adjustable conductive stops the previously described grounding circuit is completed to alert the signal seeking tuner so that it may now operate normally to stop on the next control pulse as previously described.

The receiver is usually mounted behind a panel such as 178 through which project two hollow threaded members 177 and 179 mounted on the frame 204 for support. Through member 177 extends a rod 180 which is reciprocably mounted to actuate a valving means 181 for the antenna and a concentric sleeve 188 for operating a tone control 189. Suitable knobs 184 and 192 are mounted on rod 180 and sleeve 188 to operate the same. On the opposite side a control shaft 182 and a concentric sleeve member 190 extend through the mounting member 179 and control knobs 186 and 194 are mounted respectively thereon. The knob 186 actuates the on-off switch and volume control 183 and the knob 194 actuates the sensitivity control indicated generally at 195 but which includes adjustable arm 34.

In the operation of this device the operator first actuates knob 186 to turn on the set and assuming that it is desired first to operate as a signal seeking receiver, he adjusts the knob 194 to the sensitivity required and depresses the selector switch 160. This, as before mentioned, energizes the relay 148, which attracts its armature 102, lifting the locking detent 176 away from the spring drive, and the reciprocating bar 100 is moved to tune the receiver. At this time the second triode section 136, 124, 154 of tube 118 conducts to maintain the relay 148 energized, and the first triode section is non-conducting. When a signal is received, the grid 120 of the first triode section of the tube 118 receives a positive pulse, permitting that portion of the tube to conduct. This reduces the voltage on the grid 124 of the second section and that section becomes non-conductive, which deenergizes the relay 148 and the armature drops away from the relay, the detent 176 locking the tuner in that position. This is normal signal seeking actuation.

If it is desired to operate the tuner as a sequence favorite station tuner, then the removable section 202 of the bezel is removed, revealing the ends of the various adjustable stops 66, 68, 70, 72 and 74. Each of these is moved along the rod 232 until it is in alignment with the frequency of the particular station which it is desired to receive. The simplest way to make this adjustment is to tune in a given station with the signal seeking tuner and then with the indicating needle 216 in the correct position move one of the adjustable stops so that it lies directly over the indicating needle and in contact with electrical contact 64 thereon. After all of the adjustable stops have been moved to the correct position for the desired stations, the removable section 202 may be snapped back into place, concealing the stops. The sensitivity control knob 194 then is turned until the arm 34 contacts fixed contact 44 at one extremity of travel. The selector switch 160 is then again actuated and starts the uner moving but as long as contact 64 on the indicating needle moves along the insulating rod 232 the sensitivity of the receiver is so reduced through the open grounding circuit that no pulse of sufficient amplitude will be provided on the control line 116 to drive the grid 120 positive and stop the tuning means. In other words, the triggering system is rendered ineffective.

However, immediately upon engagement between the contact 64 and the next of the adjustable stops, 66, 68, etc., in sequence, the sensitivity is immediately restored to normal and the triggering system rendered effective to stop the tuner upon receipt of the next incoming signal which is actually that signal transmitted at the previously adjusted frequency and the desired station will be received. If it is desired to obtain reception from one of the other frequencies which have been preset, the operator merely again depresses the selector switch 160 which starts up the tuning means and the contact 64 rides off of the adjustable stop with which it has been in contact very quickly so that upon release of the switch 160 the contact 64 is again riding over a section of the insulating rod. It will thus be evident that with this type of operation the receiver will stop only on predetermined set stations in sequence. It is to be noted that in this system the cathode circuit to ground is effectively open when the sensitivity control is set to the sequence operation and is completed upon engagement between the contact 64 and any one of the adjustable stope which of course are grounded to the mechanism.

Figure 6:
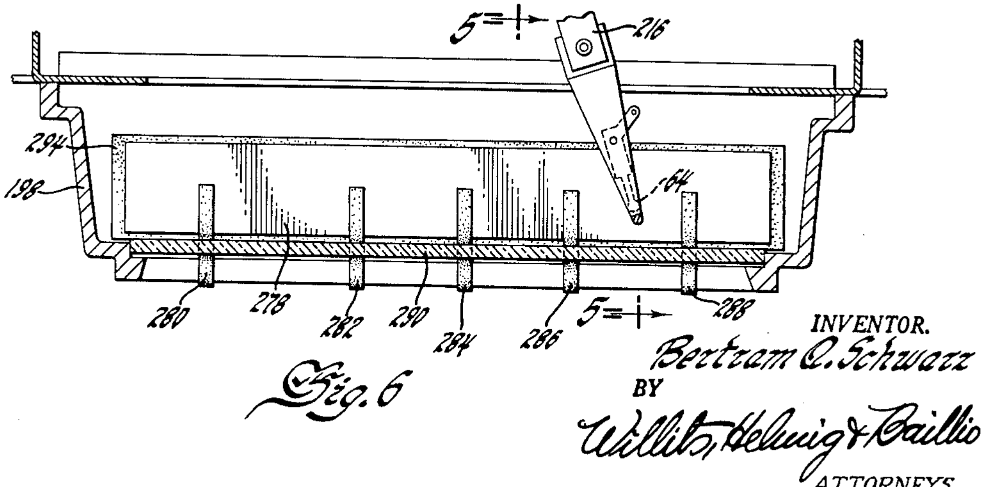
Figure 6 is a reduced horizontal sectional view through the indicating dial portion taken on line 6—6 of Figure 5.

The same result can be obtained by having a portion of the system grounded to prevent a triggering pulse from stopping the same and to break said ground to make the system operative when it arrives adjacent one of the desired stations. This type of operation is best shown in the circuit diagram Figure 8 and the physical embodiments thereof disclosed in Figures 5 and 6.

Figure 8:
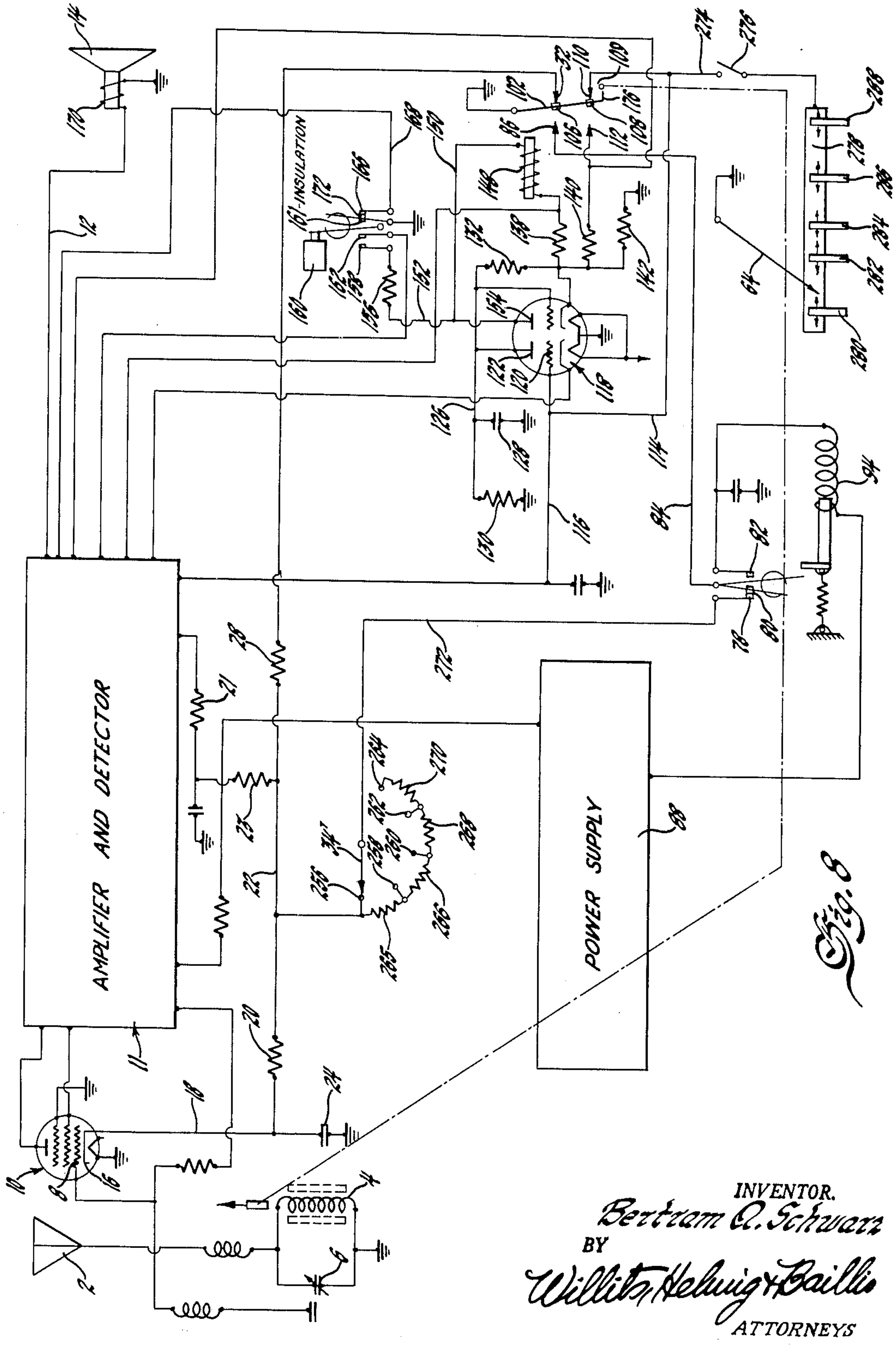
Figure 8 is a schematic wiring diagram of a radio receiver and tuner embodying that construction shown in Figures 5 and 6.

Referring first to the circuit diagram of Figure 8, like parts have been given like numerals and a specific description of the connections which remain the same is not deemed necessary. It will be noted, however, that in this instance the sensitivity control 34′ now controls only the sensitivity of the receiver during signal seeking operation. The arm 34′ is adapted to contact various stationary contacts 256, 258, 260, 262 and 264 between which there are connected resistors 265, 266, 268 and 270 respectively. By moving the adjustable arm 34′ over the contacts 256—258—260—262—264, varying degrees of resistance are inserted into the cathode circuits of the amplifier tubes to vary the sensitivity of the receiver. If it is very sensitive, pulses from even weak stations will be sufficient to stop the tuner, whereas if the arm 34′ is adjusted so that the receiver is relatively insensitive, only the strong station reception will create a sufficiently large control pulse to stop the tuner. Contact 256 is directly connected to line 22 and adjustable arm 34′ is connected through line 272 to the stationary contact 78 of the limit switch 80.

The other portion of the system which is varied from the previously described form is that line 114 which extends from the control grid 120 to stationary contact 110 of the relay 148 is now connected to line 274 which extends to a manually operated switch 276, the opposite terminal of which is connected to a conductive plate 278 mounted in the receiver over the indicating dial. A series of longitudinally adjustably positionable index stops 280, 282, 284, 286 and 288 are mounted to lie over the conductive plate and are either made of insulating material or coated with an insulating layer such as a painted surface so that they will not conduct electrically (see Figs. 5 and 6). The indicating needle is mounted to move parallel to the conductive plate and carries a conductive contact 64 which in this instance is connected to ground to engage the plate. Thus, as the needle moves along the conductive plate 278, the contact 64 will engage the plate and maintain a ground connection for the line 274 at all points except when in contact with the insulating surface of any of the adjustable stops 280, 282, 284, 286 and 288. Since line 274 is directly connected to the control grid 120 of the first triode section of the control tube 118, this section cannot conduct at any time that line 274 is grounded and, therefore, the tuner will not stop or index but will continue to operate until the indicating needle reaches the locale of one of the adjustable tabs. At that point contact 64 will ride on the insulating tab, the ground circuit on the grid will be removed, and the normal signal seeking pulse action will stop the tuner.

As seen in Figure 5, the cover plate 198 is, as before, provided with an upper opening 199 in which a glass 290 is mounted which is higher than the glass cover in the first instance, but whose upper edge is spaced a slight distance from the bezel of the cover (Figure 5). The angularly shaped narrow index strips such as 280 fit over the top of the glass 290 mounted behind the bezel and under the upper portion of the cover. As previously mentioned, these strips are either entirely made of electrical insulating material or may be metal covered with paint to prevent metallic contact. A plurality of these are provided and they may be slid along the length of the dial to various desired indexed poistions. Mounted on the under surface of the upper portion of the cover plate is a layer of insulating material 294 and secured to that is the rectangular conductive plate 278 which is thus maintained out of contact with the cover plate and electrically insulated therefrom. This plate is electrically connected to the switch 276 in the wiring diagram. The indicating needle 216 is of the same form as that previously described and carries on its upper extremity electrical contact 64 which, as the indicating needle sweeps across the dial 218, will ride either on the contact plate 278 or engage one of the adjustable index tabs 280, 282, etc., which will break the electrical circuit at this point.

It will be obvious that in the operation of this form of my invention, the index strips 280, 282, 284, 286 and 288, which are engageable from the outer surface of the bezel, are first moved longitudinally along the dial to be placed in alignment with the frequency of the various stations which it is desired to receive. As long as manually operated switch 276 remains open, the signal seeking tuner will operate in the conventional manner, stopping on any station whose signal generates a sufficiently strong pulse to trigger the tube 118 and cause the relay 148 to be deenergized. If it is desired to have the tuner operate as a sequence type favorite station tuner, then switch 276 is closed. When the selector switch 160 is next actuated and the relay 148 energized, the tuning means will be placed in operation and the indicating arm 216 will move across the dial 218. As long, however, as contact 64 on the indicating needle arm engages the conductive plate 278, a ground circuit is completed for the control grid 120 and the tuning means will be maintained in operation. However, as soon as contact 64 engages any one of the movable tabs 280, 282, etc., the grounding circuit will be immediately interrupted, permitting the next received impulse to generate a control pulse on the control grid 120 to deenergize the control relay 148 and stop the tuner. As previously, if this is not the station desired, the operator depresses the switch 160 to again start the tuner scanning, and it will stop on the next adjacent strip.

It will thus be seen that I have provided a combined tuning means which is capable either of indexing upon the receipt of an incoming signal or which can be actuated to stop only at preselected frequencies in sequence.

I claim:

1. In means for tuning radio receiving means, adjustable reactance means for tuning the radio receiving means over a predetermined band of frequencies, electro-mechanical driving means connected to the adjustable reactance means to move the same, indexing means for stopping the driving means upon the receipt of an incoming signal, an arm connected to the reactance means and moved over a prescribed path by the movement of the reactance means, a plurality of contact means adjustably positionable along the path and engageable by the arm as it moves along its course to provide switching means, and conductive means connecting the arm and the contacts into the circuit of the indexing means to render said indexing means inactive to stop the reactance tuning means on a signal impulse but to render said indexing means operative upon engagement of the arm with any one of the adjustable contacts so that the indexing means may stop the movement of the reactance tuning means.

2. In means for tuning a radio receiver, variable reactance means for tuning the radio receiving means over a predetermined portion of the frequency band, driving means connected to the reactance tuning means to move the same, indexing means including an electronic tube controlled relay to stop the driving means upon the receipt of an incoming transmitted signal, indicating means connected to said driving means to indicate the position of the reactance means, an electrically conductive member mounted on the indicating means, a conductive plate mounted along the path of travel of the conductive means over the full extent of its travel, conductor means connecting both the conductive member and plate into the circuit of the indexing means to render the indexing means inoperative to stop the tuning means, and a plurality of adjustable insulating members mounted along the path of the conductive member on the indicating means to render the indexing means operative only when the conductive member is in contact with an insulating member.

3. In radio receiving means, adjustable reactance means for tuning said radio receiving means over a prescribed frequency band, driving means connected to the reactance means to move the same, indexing means including an electronically controlled relay to stop the driving means upon receipt of an incoming signal, a dial, indicating means connected to the adjustable reactance means extending to a position adjacent the dial and movable with the reactance means over a prescribed path to indicate the position of the reactance means, switching means connected to the indexing means to activate or deactivate the same including a member carried by the indicating means and a plurality of adjustable contacts along the dial to cause said indexing means to be activated so that it may operate only when the member is in engagement with one of the contacts, and additional switching means connected to the indexing means to energize the driving means to sequentially cause the indicator to pass adjacent the contacts.

4. In indexing means for radio receiving means having an adjustable reactance means driven over a set path for tuning the receiver, a casing in which said reactance means and drive are mounted, a dial mounted in said casing, an indicating pointer pivotally mounted for straight line motion on said casing connected to said adjustable reactance means, conductive means mounted on the pointer adjacent the dial, an insulating rod mounted in the casing parallel to the dial, a slotted plate mounted on the casing and a plurality of similarly formed elongated members capable of interleaved stacked positioning, each having a tang located in the slot of the slotted plate and having an opening through which the insulating rod extends for support, said members acting as contacts grounded to the casing and being movable along the dial to select desired stations, said members engaging the conductive means on the pointer when it is in alignment therewith to complete a circuit for the indexing means.

5. In indexing means, a casing, a slotted plate mounted on said casing, a rod mounted on said casing spaced from the slotted plate, a plurality of elongated members of similar shape capable of nesting together when placed in proximity, a tang on each member extending into the slot, each member having an opening in the end opposite to that supported in the slot through which the rod extends, said members being positionable in their given sequence at any locality along the rod.

6. In indexing means, a casing, a slotted plate mounted on said casing, a rod mounted on said casing spaced from the slotted plate, a plurality of elongated members of similar shape capable of nesting together when placed in proximity, a tang on each member extending into the slot, each member having an opening in the end opposite to that supported in the slot through which the rod extends, said members being positionable in their given sequence at any locality along the rod, said members being of electrically conductive material and said rod of insulating material, an arm movable along the rod, and conductive means carried by said arm engageable with the members to periodically and sequentially provide switching means.

7. In radio receiving apparatus having adjustable tuning means, driving means to move the tuning means over a predetermined range, indexing means to stop the tuning means upon receipt of an incoming signal, indicating means connected to and driven by the tuning means to indicate the position thereof, a dial over which the indicating means moves, a conductive plate mounted adjacent the dial, a conductive member on the indicating means which is adapted to ride on the plate, conductive means connecting the member and plate to the indexing means, and a plurality of adjustable insulating tabs slidable along the plate in alignment with the dial to break the contact between the plate and conductive member to control the indexing means.

8. In indexing means for radio receiver tuning means having driving means for causing said tuning means to scan a frequency band, electronically controlled relay means to stop said tuning means upon receipt of an incoming signal including an electron tube having a control grid upon which a control pulse is developed, movable means connected to the tuning means and driven thereby along a path, and switching means including a conductive member on said movable means and a plurality of adjustable members along the path connected in a grounding circuit to the control grid to prevent operation of the electronically controlled relay by grounding said grid except in the vicinity of the adjustable members.

9. In radio receiving means having a radio frequency amplifier section, detector section and tuning means, driving means for the tuning means, electronically controlled relay means for stopping said tuning means upon receipt of an incoming signal, biasing means for the amplifier, switching means connected to the biasing means and to the amplifier to change the sensitivity of the receiver, means movable by the tuning means over a path, contact means adjustably positioned along said path and conductive means carried by the movable means and forming with said contact means a second switching means connected to said first switching means to control the sensitivity of the receiver when included in the system by the first-named switching means.

10. In radio receiving means having a radio frequency amplifier section, detector section and tuning means, driving means for the tuning means, electronically controlled relay means for stopping said tuning means upon receipt of an incoming signal, biasing means for the amplifier, switching means connected to the biasing means so that the amplifier bias may be varied by said switching means including means movable with the tuning means and a plurality of contacts adjustable along the path of the movable means so that the sensitivity of the amplifier will be altered at the locale of the contacts.

11. In radio receiving means, adjustable reactance means for tuning said radio receiving means over a prescribed frequency band, driving means connected to said reactance means to move the same, indexing means connected to the receiving means and engageable with the driving means including an electronically controlled relay to stop the driving means upon receipt of an incoming signal in the receiving means, electrical conductive means connected to said reactance means and movable over a predetermined path as the reactance means is driven, said path being formed of electrical insulating and conducting portions adjustable with respect to each other and engageable by said electrical conductive means as it moves, and circuit means connecting said electrical conductive means and said conducting portions of the path to said indexing means to control the energization of the indexing means.

12. In radio receiving means, adjustable reactance means for tuning said radio receiving means over a prescribed frequency band, driving means connected to said reactance means to move the same, indexing means connected to the receiving means and engageable with the driving means including an electronic tube controlled relay to stop the driving means upon receipt of an incoming signal in the receiving means, electrical conductive means connected to said reactance means and movable over a predetermined path as the reactance means is driven, an elongated member extending along said path, a plurality of adjustable tabs mounted along said elongated member, said tabs and said elongated member being formed alternatively of electrical insulating or conducting material to form switching means with said electrical conductive means connected to the reactance means and circuit means connecting said switching means to said indexing means to control the energization of the latter.

13. In radio receiving means, adjustable reactance means for tuning said radio receiving means over a prescribed frequency band, driving means connected to said reactance means to move the same, indexing means connected to the receiving means and engageable with the driving means including an electronic tube controlled relay to stop the driving means upon receipt of an incoming signal in the receiving means, electrical conductive means connected to said reactance means and movable over a predetermined path as the reactance means is driven, said path being formed of electrical insulating and conducting portions adjustable with respect to each other and engageable by said electrical conductive means as it moves, and circuit means connecting said electrical conductive means and said conducting portions in circuit between the input to the electronic tube and ground to determine energizable localities as the reactance tunes through the band.

References Cited in the file of this patent

UNITED STATES PATENTS

| | | |
|---|---|---|
| 2,182,352 | Prochnow | Dec. 5, 1939 |
| 2,326,737 | Andrews | Aug. 17, 1943 |
| 2,368,778 | Purington | Feb. 6, 1945 |
| 2,394,869 | Nicholson | Feb. 12, 1946 |
| 2,499,967 | Nicholson | Mar. 7, 1950 |
| 2,501,003 | Pifer | Mar. 21, 1950 |
| 2,537,944 | Colgan | Jan. 16, 1951 |
| 2,572,926 | Gull | Oct. 30, 1951 |